Figure 1:
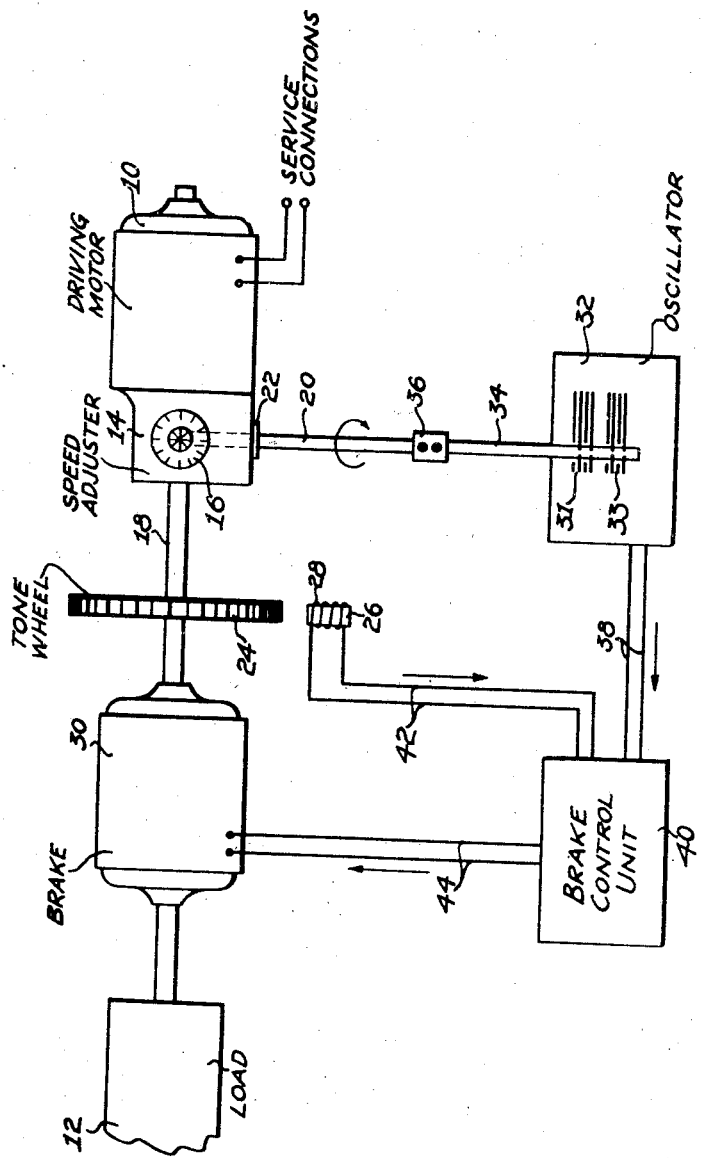

Patented Sept. 9, 1947

2,427,175

UNITED STATES PATENT OFFICE 2,427,175

SPEED CONTROL SYSTEM

Charles J. Young, Princeton, N. J., assignor to Radio Corporation of America, a corporation of Delaware Application October 30, 1944, Serial No. 561,018

14 Claims. (Cl. 172—239)

1

The present invention relates to speed control devices, and more particularly to devices for controlling the speed of a load connected to a prime mover through means for adjusting the drive ratio therebetween.

It is known in the art to control the speed of a motor in accordance with the phase relationship between two electrical waves. In U. S. Patent No. 2,325,028, granted to Maurice Artzt, for example, there is shown a device for controlling the speed of a motor in accordance with the comparison values between a locally generated wave and a synchronizing signal. Further control systems of this general nature are described in copending patent applications of Maurice Artzt, Serial No. 420,583, filed November 26, 1941, and Serial No. 504,337, filed September 30, 1943, both of these applicattions being assigned to the same assignee as the present application.

In all of the above-mentioned disclosures, the locally generated wave is obtained from a tone generator having a tone wheel rotating synchronously with the load. Since the energy wave obtained from the tone generator bears a constant phase relationship to the synchronizing signal at all times when the load is running at proper speed, the addition to such systems of any mechanism for controllably increasing or decreasing the speed of the load will alter this constant phase relationship in the same way as do uncontrollable increases or decreases in load speed.

It is often convenient and desirable, however, to provide a system utilizing the wave-comparison method of speed control above outlined, but in which the drive ratio between the motor and its load is not fixed, such drive ratio instead varying over a certain range. Such a system is particularly useful in facsimile reception, for example, where different transmission speeds may be used. In order to carry out such an object, means must be provided for maintaining the constant phase relationship between the locally generated wave and the synchronizing signal during periods when different load speeds are used corresponding to different drive ratios between the load and the prime mover.

According to one embodiment of my invention, therefore, I employ a motor connected to a load through a mechanical speed adjusting unit. This speed adjusting unit has a manually operable control for obtaining any desired speed ratio within a predetermined range between the motor shaft and the drive shaft. In addition to the above, an oscillator is provided which is tunable

2 over a band of frequencies and is stable at any one setting. The speed adjusting unit is so coupled to the oscillator that when the manual control of the former is operated to vary the speed ratio of the motor and the drive shaft, the frequency of the oscillator is changed. By a proper selection of circuit constants, the change in oscillator frequency thus obtained may be made proportional to the change in speed drive ratio.

By then employing a tone generator to produce a wave output indicative of the speed of rotation of the load, this wave output from the tone generator will normally be in constant phase relationship with the oscillator output regardless of the setting of the speed adjusting unit. Any change in load speed apart from that produced by manual operation of the speed adjusting unit will change the frequency of the wave produced by the tone generator but not the output frequency of the oscillator. Thus the constant phase relationship between the two waves will be altered, and a compensating voltage produced which acts upon the system to return the load to its proper speed of rotation for the particular drive ratio than in effect.

According to the above embodiment both the wave from the tone generator and the wave output of the oscillator are caused to vary in frequency in a synchronous manner during any manually-controlled change in speed ratio between motor and load. However, upon any undesired fluctuation in load speed causing a deviation in output from the tone generator from the frequency normally produced at that particular speed ratio, the two waves will no longer be "in step." This out-of-step relation is utilized as above described to create a compensating control wave which tends to bring about a return of the system to its normal operating status. Furthermore, the load speed is always accurately controlled even though there be small fluctuations in the speed ratio delivered by the adjusting unit itself, as is often the case in friction type continuous-ratio devices. Since these small fluctuations are not due to manual operation of the adjusting unit, they have no effect on the output frequency of the oscillator.

One object of the present invention, therefore, is to provide a method and means for controlling the speed of a load in systems having means for adjusting the drive ratio between the prime mover and its load.

Another object of the invention is to provide, in a motor control system having adjustable drive means for varying the speed ratio between motor and load, a method and means for varying the tuning of an oscillator in accordance with variations in the said speed ratio.

A further object of the invention is to provide, in a motor control system having adjustable means for varying the speed ratio between motor and load, a method and means for tuning an oscillator in accordance with variations in the said speed ratio, comparing the wave output of the oscillator with a wave indicative of the speed of the load, and employing deviations from a constant phase relationship between the two waves to control the speed of the load.

Figure 2:
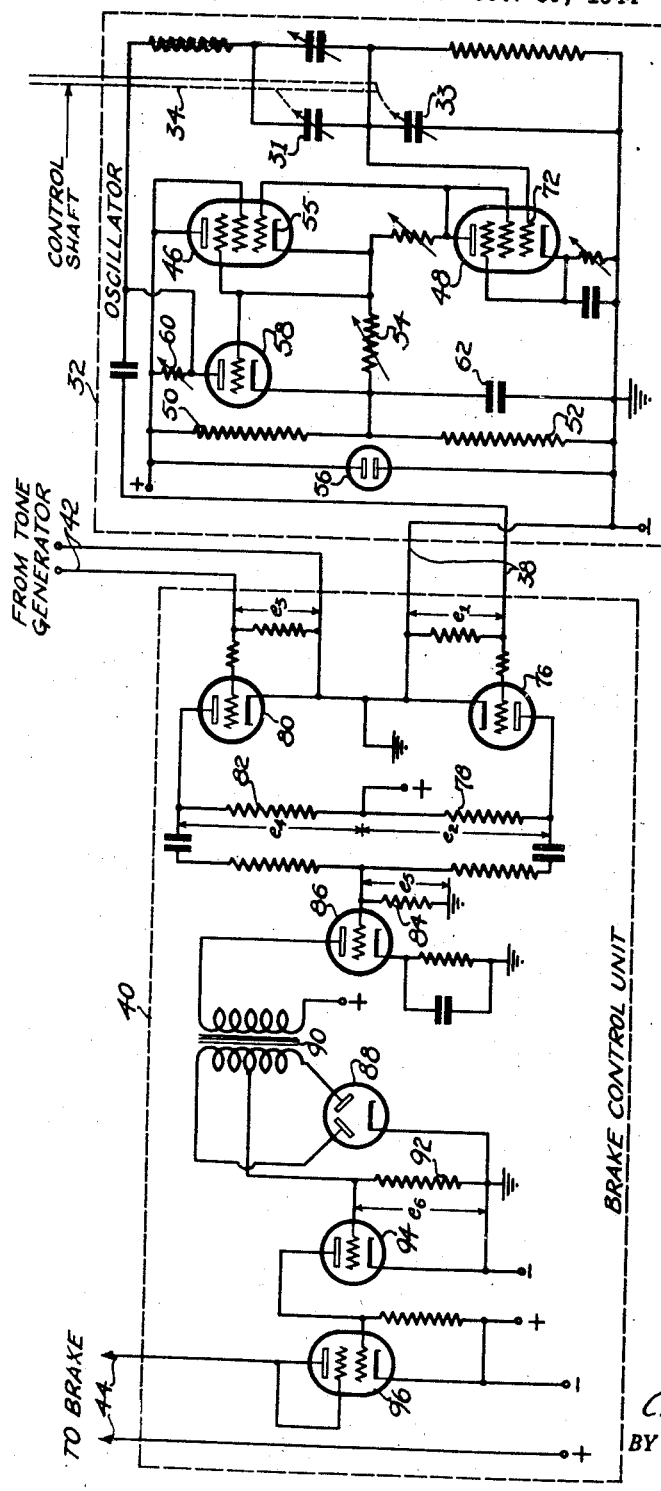

Other objects and advantages will be apparent from the following description of a preferred form of the invention and from the drawings, in which:

Fig. 1 is a partially diagrammatic illustration of one form of motor control system embodying the present invention; and Fig. 2 is a schematic illustration of circuits suitable for use in both the oscillator and brake control units of Fig. 1.

Referring to Fig. 1 of the drawings, a prime mover 10 such as an induction motor is shown driving a load 12, which may, for example, be the copy holding drum of a facsimile scanner or any other device the speed of rotation of which must be precisely regulated. Attached to the driving motor 10 is a mechanical speed adjusting unit 14 provided with a manually operable dialed control knob 16 by which the speed drive ratio between the motor 10 and its output shaft 18 may be varied over a certain range. This range in practice may have an upper limit in the order of 9:1. Speed adjusting units of the above type are known in the art, and a detailed description of their construction and operation will not be given.

Also controlled by the knob 16 is a rotatable shaft 20, the axis of which is at right angles both to the longitudinal axis of the output shaft 18 and the axis of rotation of the knob 16. One end of shaft 20 is securely attached to a plate 22 which is provided exterior of the speed adjuster housing. Plate 22 is arranged to rotate in response to a rotation of knob 16, and the rotation of these two members is so interrelated that, as the knob 16 is turned to vary the speed drive ratio between motor 10 and shaft 18 over its full range, plate 22 rotates through an angle of approximately 180°. Plate 22 and shaft 20 do not rotate at any time except during actuation of knob 16, and are stationary during operation of motor 10 once the particular drive ratio desired has been selected. It will thus be appreciated that the angular position of shaft 20 is a function of the speed drive ratio between output shaft 18 and motor 10 as determined by the setting of knob 16.

Mounted on the output shaft 18 is a tone wheel 24 which is provided with teeth so that as the tone wheel revolves the teeth pass through the magnetic field of a magnet 26, thereby producing an alternating voltage in a coil 28 wound on magnet 26. It will be understood that the tone wheel 24 may be geared to the shaft 18 or mechanically connected in any suitable manner to a moving part of the load 12.

Serving as an eddy current or magnetic brake to retard the driving motor 10 is an induction motor 30 coupled to or otherwise associated with the output shaft 18. The action of the induction motor 30 in response to variations in phase between the tone generated by tone wheel 24 and the output of a tunable oscillator will be discussed hereinafter in connection with a description of the production of such phase variations.

Shown diagrammatically in Fig. 1 by the reference character 32 is a tunable oscillator. This oscillator may be of any suitable type having stable operating characteristics, and has means for varying the tuning thereof over a predetermined range. As shown in Fig. 1, this tuning means includes two variable capacitors 31 and 33, the rotors of these capacitors being mounted on a common control shaft 34. Any other suitable tuning means controllable by shaft 34 may be employed in place of capacitors 31 and 33 if desired, the particular means used being dependent in part on the type of oscillator circuit selected.

Shaft 34 is positioned so that it is substantially coaxial with shaft 20. Coupling together the adjoining ends of shafts 20 and 34 is an adjustable collar 36. It will be apparent that when shafts 20 and 34 are securely coupled together by collar 36, any rotation of plate 22 as a function of the rotation of knob 16 will produce a corresponding movement of the rotor portions of capacitors 31 and 33.

The output of oscillator 32 is applied over conductors 38 to a brake control unit shown diagrammatically at 40. Also applied to the brake control unit 40 over conductors 42 is the tone produced in coil 28 in response to rotation of tone wheel 24. The output of brake control unit 40 is fed to brake 30 through leads 44.

The system of Fig. 1 thus provides a method and means whereby the load speed is at all times directly controlled by the oscillator 32 through reference to the tone wheel 24. In setting up the apparatus, the driving motor 10 is caused to rotate at a chosen speed, say for example, 1740 R. P. M. The speed adjusting unit 14 is set for a 1:1 drive ratio. The shaft 34 is then turned manually (collar 36 being loosely adjusted so that shafts 20 and 34 may rotate independently of one another) until oscillator 32 locks in the drive shaft 18. The oscillator output is now of the proper frequency for a 1:1 drive ratio between motor 10 and load 12, and a constant phase relationship is established between the output of the oscillator and the tone developed by tone wheel 24 rotating synchronously with load 12. The collar 36 is then tightened so as to secure together the shafts 20 and 34.

Under the above conditions, any fluctuation in speed of the load 12 (and consequently shaft 18) will cause a slight variation in the frequency of the tone from coil 28. However, if this is for any reason except manual actuation of knob 16 shaft 20 will remain stationary, and the frequency of the output from oscillator 32 will not be changed. This affects the normally constant phase relationship of the two electrical waves applied to brake control unit 40 over conductors 38 and 42. In consequence the output of control unit 40 which is applied to brake 30 over leads 44 will vary, thereby altering the effectiveness of the brake in a manner to be described at greater length in connection with a description of the circuits of Fig. 2.

When the knob 16 is manually actuated from a position delivering a 1:1 drive ratio, the speed of shaft 18 will be decreased relative to the speed of the motor (or increased, according to the design of the speed changing unit employed). A decrease in speed of shaft 28 (and thus of tone wheel 24) will lower the frequency of the tone produced in coil 28. At the same time shaft 20 will be turned to vary the tuning of oscillator 32 so that its output frequency will be lowered in proportion to the decrease in speed of shaft 18. This is accomplished by shaping the rotor plates of capacitors 31 and 33 so that variations in oscillator output will "track" with variations in speed drive ratio. Accordingly, both the output wave from the oscillator and the wave indicative of load speed are correspondingly decreased in frequency.

It should be emphasized that the phase relationship of the two waves remains substantially constant regardless of the absolute speed of the shaft 18 as long as such absolute speed is proper for the particular drive ratio then in effect as determined by the setting of knob 16, and that any random fluctuation in load speed from such absolute value will produce slight or momentary changes in phase. The resulting change in output energy from control unit 40 will bring about a compensating action by brake 30. This variation in energy output from control unit 40 is not dependent on any particular drive ratio, but will be produced at any drive ratio within the available range whenever the speed of load 12 departs from normal for that ratio.

Fig. 2 shows two circuits suitable for use respectively in the oscillator and brake control units of Fig. 1. Referring first to the oscillator unit 32, there is an R-C oscillator circuit which is stable over the range of frequencies utilized. This circuit is described and claimed in a co-pending application of Maurice Artzt entitled "Resistance-capacitance oscillators," Serial No. 491,613, filed June 21, 1943. It should be understood that this particular circuit has been selected merely as an example, and that other suitable types of oscillators may be employed in place thereof if desired.

Oscillator 32 employs a balanced D.-C. amplifier consisting of tubes 46 and 48 as the input stage. The circuit arrangement of this amplifier is fundamentally the same as that shown and described in Artzt Patent No. 2,310,342, issued February 9, 1943. A pair of serially interconnected equivalent resistors 50, 52 is disposed between the power source terminals marked with plus and minus signs. The junction between resistors 50 and 52 is connected through a load resistor 54 to the cathode 55 of tube 46. A peak voltage regulator device 56 of any well-known type is preferably connected across the power supply terminals.

The second stage of this oscillator circuit comprises the triode 58, from the anode of which feedback potential is derived for application to the input circuit of tube 48. The input circuit for tube 58 includes the adjustable resistor 54.

The output circuit includes the anode resistor 60 and resistor 52 which is connected between the cathode of tube 58 and ground. Bypass condenser 62 is in shunt with resistor 52.

When no signal voltage is applied to grid 72, both tubes 48 and 46 draw approximately normal class A plate current and the voltage across resistor 54 is substantially zero. So tube 58 is at zero bias or slightly negative by making tube 48 draw slightly more current than tube 46. The overall amplification from grid 72 to resistor 60 is set by adjusting the values of resistors 54 and 60 so the total maximum amplification is just slightly larger than the network loss from resistor 60 back to tube 72. At the frequency where the network phase shift is 0°, the circuit will then oscillate and deliver a sine wave output.

The two variable capacitors 31 and 33 are illustrated schematically in Fig. 2 as having their rotors mounted on control shaft 34 in the manner shown in Fig. 1. By rotation of shaft 34, the operating frequency of the oscillator 32 may be varied within a predetermined range as hereinabove described.

If the output of oscillator 32 applied to brake control unit 40 be designated as $e_1$, and if the alternating voltage produced in the coil 28 by the passage of the teeth on the tone wheel 24 through the magnetic field in the neighborhood of the magnet 26 be designated as $e_3$, it will be appreciated that there will be a constant phase relationship between these two waves. This relationship may be an in-phase condition, or with the voltage $e_3$ leading or lagging the voltage $e_1$ by a constant angle.

The two waves $e_1$ and $e_3$ are applied to a brake control unit 40 which may be of the type described and claimed in Artzt application Serial No. 504,337, above mentioned, although other known types of control circuits may be substituted therefor if convenient or desirable. The wave $e_1$ (which is approximately sinusoidal) is passed through a tube 76 which operates as a limiter-amplifier in a manner well known in the art to change the sine wave $e_1$ into a series of square waves $e_2$ appearing across resistor 78. The output voltage $e_3$ of coil 28, which is also substantially sinusoidal and equal in nominal frequency to the frequency of the voltage $e_1$, is applied to a tube 80 which also operates as a limiter-amplifier, the output of which is a series of square wave impulses $e_4$ appearing across resistor 82. In normal operation, the frequency of waves $e_2$ and $e_4$ is equal, but the phase relationship between them may vary momentarily. The resulting beat frequency voltage $e_5$ appears across a resistor 84.

The voltage $e_5$ is amplified, if desirable or necessary, in an amplifier tube 86 of any suitable type, the output of which is impressed on a full-wave rectifier 88 by way of a transformer 90. A unidirectional pulsating voltage $e_6$ is produced in the output circuit of the rectifier 88 across a resistor 92, the equivalent average value of which varies in amplitude with the phase relationship between the two voltages $e_1$ and $e_3$.

The unidirectional pulsating voltage $e_6$ is amplified by a tube 94 and a power amplifier tube 96. The amplified current output of tube 96 is applied over conductors 44 to the primary of brake motor 30. The amplified voltage wave in the output of tube 96 accordingly will be a D.-C. voltage varying in average potential in direct proportion to the phase shift. Since the brake load is merely the equivalent of an induction motor with D.-C. applied to the windings, all induced currents in the rotor are loss currents and increase the load.

This variable load is controlled in value to hold the output shaft in synchronism with the output of the oscillator, the brake load varying in effect fast enough to give a cycle-by-cycle synchronism rather than an average speed control. Any type driving motor may be used, induction or other, in which a varying load will vary the speed over the range of brake control desired.

Although I have illustrated and described, and have pointed out in the annexed claims, certain novel features of my invention, it will be understood that various omissions, substitutions, and changes in the method and apparatus set forth may be made by those skilled in the art without departing from the spirit of the invention.

I claim:

1. In a system for controlling the speed of a load connected to a motor the speed of which varies in accordance with a change in load, the combination of adjustable drive means for changing the speed ratio of motor and load, an oscillator having means for varying the frequency thereof, means for simultaneously adjusting both said drive means and said means for varying the frequency of said oscillator, means for deriving a signal representative of the speed of said load, means for comparing said signal and the output of said oscillator, and means for applying the output of said comparing means to maintain constant the speed ratio of said motor and load as determined by the adjustment of said drive means.

2. A system in accordance with claim 1 in which said means for simultaneously adjusting both said drive means and said means for varying the frequency of said oscillator includes a manually actuatable control member.

3. A system in accordance with claim 1 in which said means for simultaneously adjusting both said drive means and said means for varying the frequency of said oscillator includes a mechanical connection between said simultaneously adjusting means and the means for varying the frequency of said oscillator.

4. A system in accordance with claim 1 in which said means for deriving a signal representative of the speed of said load includes a tone generator.

5. In an apparatus for regulating the speed of a load connected to a motor so as to permit manually-controllable variations in the speed ratio therebetween, the speed of said motor being responsive to a change in load, the combination comprising an oscillator and means responsive to a manually-controlled variation in the speed ratio between said motor and load for changing the frequency of said oscillator.

6. In an apparatus for regulating the speed of a load connected to a motor so as to have a variable speed ratio therebetween, the speed of said motor changing upon a change in said load, the combination comprising an oscillator and means responsive to a variation in the speed ratio between said motor and load for changing the frequency of said oscillator.

7. In a system of the type utilizing a prime mover having a manually-adjustable unit associated therewith for varying the speed ratio between the prime mover and its drive shaft, the combination comprising a circuit for developing electrical waves having a normally substantially constant frequency and means responsive to manual adjustment of said speed ratio varying unit for changing the frequency of the waves developed by said circuit in accordance with the speed of said drive shaft as determined by the manual adjustment of said unit.

8. In a system of the type utilizing a prime mover having a manually-adjustable unit associated therewith for varying the speed ratio between the prime mover and its drive shaft, the combination with a circuit for developing electrical waves having a normally substantially constant frequency of means responsive to manual adjustment of said unit for changing the frequency of the waves developed by said circuit, means for developing further electrical waves indicative of the speed of rotation of said drive shaft, and means for combining said electrical waves to produce a control wave.

9. In a system for controlling the speed of a load connected to a motor in adjustable speed-drive relation, the speed of said motor varying in accordance with a change in said load, means for developing a first electrical wave indicative of the instantaneous adjusted speed ratio between motor and load, means for developing a further electrical wave indicative of the instantaneous speed of said load, means for comparing said two waves, and means for applying the output of said last-mentioned means to maintain constant the adjusted speed ratio of said motor and load.

10. In a system for controlling the speed of a load connected to a prime mover in adjustable speed-drive relation, the speed of said prime mover being responsive to a change in said load, the method of obtaining a load speed control wave which includes developing an energy wave representative of the instantaneous speed of rotation of said load developing an energy wave representative of the instantaneous adjusted speed ratio between prime mover and load, and combining said developed energy waves to produce a further energy wave, and applying said further energy wave to maintain constant the adjusted speed-drive relation of said prime mover and load.

11. In a system for controlling the speed of a load connected to a motor through adjustable means for changing the speed ratio of motor and load, the speed of said motor being responsive to a change in said load, the method which comprises the steps of developing a first signal wave having a frequency representative of the instantaneous adjusted speed ratio of motor and load, developing a further signal wave having a frequency representative of the instantaneous speed of said load, comparing the developed signal waves, and applying the wave representative of the comparison of said signal waves to maintain constant the speed of said load as determined by the adjusted speed ratio between said load and said motor.

12. In an apparatus for regulating the speed of a load connected to a prime mover so as to permit a manually-controlled adjustment of the speed ratio therebetween, the speed of said motor varying with a change in said load, the method which comprises developing electrical waves of normally substantially constant frequency and then changing the frequency of said waves in accordance with the adjustment of said speed ratio.

13. In a system for controlling the speed of a load connected to a motor, the speed of which varies in accordance with a change in load, the combination of adjustable drive means for changing the speed ratio of motor and load, an oscillator having means for varying the frequency thereof, means for simultaneously adjusting said drive means and said means for varying the frequency of said oscillator, means for deriving a signal representative of the speed of said load, means for comparing said signal and the output of said oscillator, an electro-magnetically operated brake exerting a retarding force on said load, and means for applying the output of said comparing means to said brake to thereby control the speed of said load in accordance with the speed ratio between said motor and load as determined by the adjustment of said drive means.

14. In a system of the type utilizing a prime mover having control means associated therewith for varying the speed ratio between the prime mover and its drive shaft, the combination comprising a circuit for developing electrical waves having a normally substantially constant frequency, means for simultaneously varying the selected speed ratio and the frequency of oscillation of the electrical waves under the influence of the said control means, means for developing further electrical waves indicative of the instantaneous speed of rotation of said drive shaft, an electro-magnetically operated brake exerting a retarding force on said drive shaft, means for combining said electrical waves to produce a control wave, and means for applying said control wave to said brake to thereby control the speed of said drive shaft in accordance with the speed ratio between said prime mover and its drive shaft as determined by the adjustment of said adjustable means.

CHARLES J. YOUNG.

REFERENCES CITED

The following references are of record in the file of this patent:

UNITED STATES PATENTS

| Number | Name | Date |
|---|---|---|
| 2,340,875 | Gibbs | Feb. 8, 1944 |